United States Patent Office 3,556,926
Patented Jan. 19, 1971

3,556,926
SHOCK-COOLED CAULKING TAPE AND METHOD OF PREPARATION
Victor A. Rundle, Oakland, Calif., assignor to Chevron Research Company, San Francisco, Calif., a corporation of Delaware
No Drawing. Filed Apr. 2, 1968, Ser. No. 718,203
Int. Cl. B29f *3/08;* B32b *7/10;* C08f *45/52*
U.S. Cl. 161—165        9 Claims

ABSTRACT OF THE DISCLOSURE

Caulking tape and method of preparation of tape which consists of extruding in tape form a fused mixture of oil-microcrystalline wax and stereoregular polypropylene and rapidly cooling one side of the tape to at least 150° F. below the fusion temperature of the mixture, wherein the oil is present in form 10 to 50% by weight of the said oil-microcrystalline wax combination.

BACKGROUND OF THE INVENTION

In building construction, open spaces or cracks are often left either as a simple consequence of improper fit in connecting two units together, because spaces are left in order to provide for expansion due to variations in temperature coefficients of expansion, or because shrinkage results due to moisture losses from materials.

Places where caulking is often used include between metal panels, precast panels, expansion joints, around perimeters of door frames and window frames, coping joints, etc. Another place where caulking is desirable is in the space left where a pipe passes through a part of the structure.

In the past, caulking of such seams has been accomplished by filling the point with asphalt impregnated oakum, or by filling the seam with a plastic polymeric material from a manually operated of air-operated caulking gun, etc. While generally effective in filling the joints, such methods generally require a great deal of experience and are somewhat time-consuming in application.

In addition to ease of application, caulking methods and material should provide sealing of the joints with flexible material in order that expansion of the joints, due to temperature or other effects, will not leave a remaining space.

SUMMARY

It has now been found that caulking can be inexpensively accomplished by application of a novel caulking tape. The tape is prepared by shock-cooling on one surface an extruded mixture of microcrystalline wax, oil, and certain stereoregular polypropylenes. Preferably, the mixture of oil and wax is in the form of a petrolatum.

Since the preferred and most commonly used embodiment of the invention will be the petrolatum-polymer mixtures, the microcrystalline wax and oil will be treated as an entity, recognizing that this combination may be achieved by employing a suitable petrolatum, by combining the wax and oil prior to combination with the polymer, or by combining the three components at one time.

Microcrystalline waxes which comprise one component of the compositions used to produce the novel tape of the invention are petroleum waxes, as are also paraffin waxes. However, they differ from the paraffin waxes by forming only small, indistinct crystals rather than the distinct plates and needles of the paraffin materials. They have a molecular weight in the range of 400 to 700 and average 40 to 50 carbon atoms per molecule. They contain a large number of branched-chain molecules, have randomly distributed branching and contain appreciable quantities of cyclic compounds.

The oils which comprise a component of the invention are oils of lubricating viscosity. The oil is preferably a mineral oil—paraffin, naphthenic or mixed base. However, also suitable are synthetic oils such as lubricating oils derived from coal products, and synthetic oils, e.g., alkylene polymers (such as polymers of propylene, butylene, etc., and the mixtures thereof), alkylene oxide-type polymers (e.g., alkylene oxide polymers prepared by polymerizing alkylene oxide, e.g., propylene oxide polymers, etc., in the presence of water or alcohols, e.g., ethyl alcohol), carboxylic acid esters (e.g., those which were prepared by esterifying such carboxylic acids as adipic acid, azelaic acid, suberic acid, sebacic acid, alkenylsuccinic acid, fumaric acid, maleic acid, etc., with the alcohols, such as butyl alcohol, hexyl alcohol, 2-ethylhexyl alcohol, pentaerythritol, etc.), liquid esters of acids of phosphorus, alkylbenzenes, polyphenyl (e.g., biphenyls and terphenyls), alkylbiphenyl ethers, polymers of silicon (e.g., tetraethyl silicate, tetraisopropyl silicate, tetra(4-methyl-2-tetraethyl) silicate, hexyl (4-methyl-2-pentoxy) disiloxane, poly(methyl)siloxane, and poly(methylphenyl) siloxane, etc.

The mixture of oil and microcrystalline wax will contain from about 10–50% by weight of the oil and from about 90–50% by weight of the wax. A preferred range of oil content will be from about 15% to 40%. The wax-oil-polypropylene composition will contain from about 80 to 98% of the wax-oil mixture and from about 2 to 20%, preferably 5 to 15%, polypropylene. As previously indicated, in many instances it will be advantageous to add other additives, e.g., stabilizers, clarity improvers, etc. Generally, the stabilizers will range from about 0.1 to 10% by weight of the composition.

Illustrative of various additives which may be included in the wax-oil polypropylene compositions are antioxidants: 2,2' - methylene-4-methyl-phenol, 2,6-di-tert.-butyl-4-methyl-phenol, other alkyl substituted phenols commercially available under the trade designation "Santonox;" epoxidized fatty acids, triphenylphosphite, etc.; dyes, etc. The amounts of the additives individually or together will rarely exceed 10%, usually not exceeding 5%. Generally, the weight of the additives will be about 0.001–2% of the wax-oil-polypropylene composition.

As previously mentioned, the wax-oil combination may be a petrolatum, which is defined as a mixture of oil and microcrystalline waxes extracted from paraffinic base oils. The petrolatum will have generally an AMP (ASTM D 127–60) of about 125° to 200° F., more usually of about 140° to 200° F. The oil content will generally be from about 10 to 50%, more usually from about 15 to 40%. The petrolatum will have an ASTM Cone Penetration (D 937–58) of from about 25 to 125, more preferably from about 50 to 100. Thus, most USP petrolatums which have penetrations in the range of about 150 to 250 will not be suitable due to their extremely soft nature.

The polypropylene employed is a high molecular-weight stereoregular polypropylene, most conveniently prepared by the use of "Ziegler-type" catalysts. These catalysts include a reducible heavy metal compound, plus an organo-metal reducing agent. The most common catalysts are the titanium halides and alkyl aluminum or alkyl aluminum halides.

The molecular weight of the polypropylene will generally be at least about 200,000 and may be as high as 5,000,000 or more. Preferably, the molecular weight will be in the range of about 250,000 to 2,000,000.

Alternatively, the polymer may be described in terms of its Melt Flow Rate, MFR, $N_2$, 230° C., 2160 g., ASTM 1238–62T, Method L. The melt Flow Rate (MFR) will be in the range of about 0.1–10. It is preferred that the MFR be in the range of about 0.1 to 3, more preferably 0.1 to 1.0.

The stereoregular polypropylene will be primarily isotactic in character. That is, it will be generally no more than 25% soluble in boiling hexane and, more preferably, not more than about 10% soluble. For the most part, the polymers are readily crystallizable and can be induced to crystallize by various means known in the art.

The tapes are prepared by mechanically combining either the wax-oil mixture or petrolatum with the high molecular weight stereoregular polypropylene and extruding the mixture under conditions which approximate those normally used for the extrusion of polypropylene. The extrudate is then rapidly cooled on one width of the tape to a temperature substantially below the melting temperature of the petrolatum.

The rapid or "shock" cooling results in the formation of a layer of material on the cooled surface having high tensile strength and lacking the stickiness that remains in the other portion of the tape. The tape, being self-supporting and having one exterior surface which does not adhere firmly to the other surface, may be rolled into a spiral and thus may be easily packaged and handled.

The layer of higher strength, the exact character of which is unknown, will generally be from 1 to 5 mils in thickness. The tape is prepared in a form suitable for unrolling and filling caulking joints. Thus, it will generally be from about 0.25 to 1.5 inches in width, preferably about 0.50 to 1.0 inch, and will be from about 0.125 to about 0.75 inch, preferably from about 0.25 to 0.50 inch, in thickness.

In preparing the novel caulking tape of this invention, the wax-oil and polypropylene or the petrolatum and polypropylene may, optionally, be mechanically mixed prior to extruding, in order to relatively homogenously distribute the polypropylene throughout the petrolatum. The polypropylene may be used in the form of powder, pellets, compacts, or other convenient form and size.

Alternatively, the wax, oil and polypropylene may be directly introduced into the extruder hopper without prior mixing, or any two of the components may be mixed prior to the introduction.

The extruder will be operated in such manner that the temperature at the extruder head or die is above the petrolatum-wax mixture fusion temperature; generally, thin will be above the polypropylene melting temperature, i.e., 320° F. Usually, the extrusion temperature will be in the range of about 350° to 550° F.

Various additives may be included with the petrolatum-polypropylene mixture, such as stabilizers, pigments, etc.

As the extrudate leaves the die, one surface of the tape width is impinged against a cooling surface, rapidly cooling that surface to a temperature at least 150° F. below the fusion temperature; preferably, at least about 250° to 450° F. below, to bring the temperature of the extrudate to about 30°–150° F., desirably 50°–135° F., more preferably 50°–125° F. The time period in which the cooled surface of the extrudate is brought from the melt temperature to the desired range will generally be about 0.001 second to 2 seconds, preferably from about 0.005 to 0.1 second.

The cooling of the extrudate surface can be achieved by any convenient mechanical means, by depositing the extrudate on a cooled surface, etc. It is preferred that the extrudate be deposited upon a chilled roll, preferably a chilled metal roll. The temperature range of the chilled roll will generally be from about 30° to 90° F., more preferably about 40° to about 80° F. The opposite side of the tape, i.e., the one not contacted with the cooled surface, is allowed to cool at ambient temperature.

Caulking tapes formed in such manner have excellent flexibility and impact strength, and since one side has lost the adhesive properties of the mix, may be easily handled and rolled. Since it does not stick to itself firmly, the roll may be easily separated and applied to cracks, etc.

The following examples are offered by way of illustration and not by way of limitation:

EXAMPLE 1

90 g. of petrolatum (Chevron Petrolatum No. 110) having a penetration at 77° F. (ASTM D–937) of 35 and a melting point of 164° F. was mixed with 10 g. of stereoregular polypropylene having an MFR of about 0.4 g./10 minutes and a molecular weight of about 450,000. 0.1 g. of butylated hydroxytoluene oxidation inhibitor was added. The materials were blended by heating the mixture to 350° F. and mixing until smooth. The mixture was allowed to cool slowly to room temperature. The resulting mixture was soft and moldable and had good adhesion properties. However, due to granular texture and low tensile strength, the material was unsuitable for use as a caulking agent without a support.

EXAMPLE 2

Shock cooled petrolatum-polypropylene blend

A mixture was prepared identical to that prepared in Example 1. The mixture, however, was cast in the form of a tape onto a metal plate which was at a temperature of about 70° F. The tape was approximately 3/16 inch in thickness. The materials on the side of the tape that was allowed to cool slowly to ambient temperature remained soft and moldable and had good adhesion properties. The shock cooled layer, which had come in contact with the cold plate, was about 1 to 5 mils in thickness and was of such increased tensile strength and elongation that it allowed the material to be easily handled and rolled into a tape form.

The tape, which could be unrolled easily, had excellent adhesion when pressed into a joint. It remains soft and pliable for an extended period.

What is claimed is:

1. A method of preparing caulking tape comprising the steps of:
    (A) combining from 80 to 98% by weight of an oil-wax combination (I) with from 2 to 20% by weight of a polymer (II);
    (B) extruding the combination of (I) and (II) at a temperature at least above its fusion temperature in the form of a tape having a thickness of at least 0.125 inch; and
    (C) rapidly cooling one surface of the width of said tape to a temperature at least 150° F. below the fusion temperature of the combination of I and II, wherein (I) is a combination of an oil of lubricating viscosity and a microcrystalline wax, said combination having an AMP in the range of 125° F. to 200° F. and an ASTM Cone Penetration of from about 25 to 125, and wherein the oil is present in said combination in from 10 to 50% by weight, and (II) is a stereo-regular polypropylene having an MFR in the range of about 0.1 to 10.

2. The method of claim 1 in which (I) is a petrolatum, and wherein said oil is present in from 15 to 40 percent by weight.

3. The method of claim 2 in which the petrolatum has an ASTM Cone Penetration of from 50 to 100.

4. The method of claim 1 in which the polypropylene has an MFR in the range of about 0.1 to 3.

5. The method of claim 4 in which the MFR is in the range of about 0.1 to 1.

6. The method of claim 1 in which step (B) is accomplished by impinging the tape against a cooling surface, said surface being at a temperature of from about 40° to 90° F.

7. The method of claim 6 in which the cooling surface is a metal roll.

8. The method of claim 1 in which the cooling of the tape surface is accomplished in a time of from about 0.0001 to 2.0 seconds.

9. The caulking tape prepared by the method of claim 1, being of a total thickness of from about 0.125 to about 0.75", having on one side a non-adhesive layer of from about 1 to 5 mils in thickness and the opposite side an adhering layer, and wherein the surfaces of the two sides can be readily separated.

References Cited
UNITED STATES PATENTS

| | | | |
|---|---|---|---|
| 2,298,846 | 10/1942 | Skooglund | 264—176 |
| 3,324,217 | 6/1967 | Armstrong et al. | 264—178 |
| 3,376,244 | 4/1968 | Rundle | 260—28.5 |
| 3,389,107 | 6/1968 | Hunter et al. | 264—178 |

ROBERT F. WHITE, Primary Examiner

J. R. THURLOW, Assistant Examiner

U.S. Cl. X.R.

260—28.5; 264—216